Jan. 24, 1967   A. R. PACKARD ET AL   3,299,916
RADIAL ARM SAW ADJUSTMENT MEANS
Filed July 23, 1964                                                2 Sheets-Sheet 1
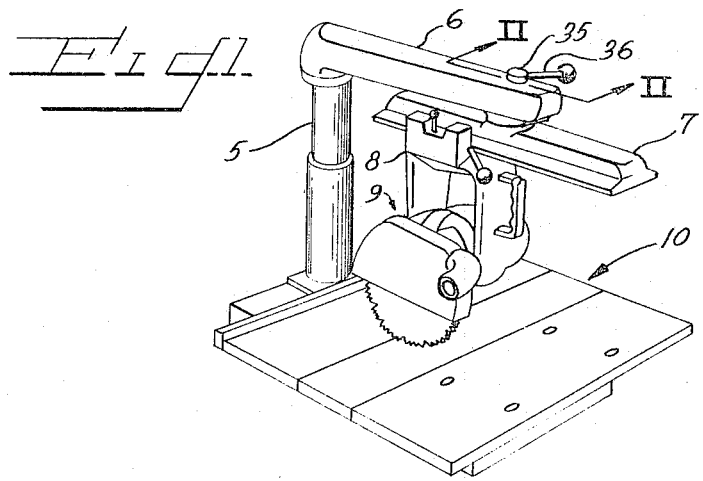
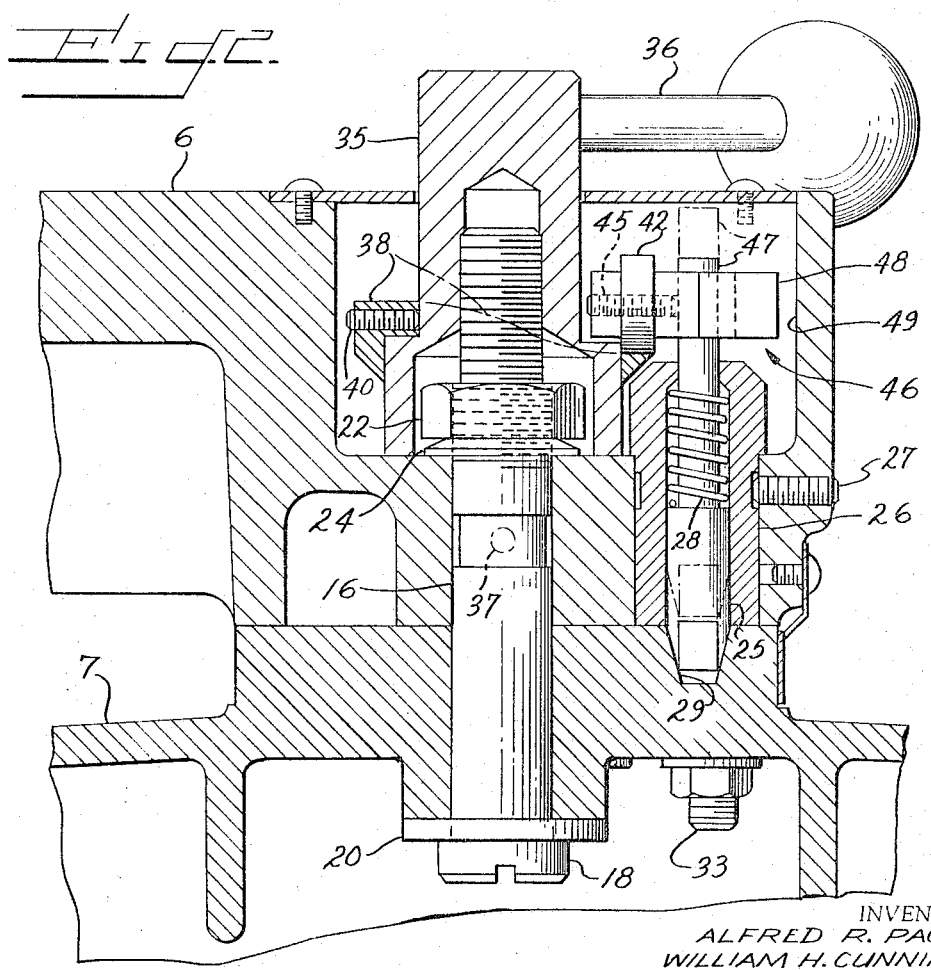
INVENTORS
ALFRED R. PACKARD
WILLIAM H. CUNNINGHAM
BY Chapin & Neal
Attorneys Jan. 24, 1967   A. R. PACKARD ET AL   3,299,916
RADIAL ARM SAW ADJUSTMENT MEANS
Filed July 23, 1964   2 Sheets-Sheet 2

INVENTORS
ALFRED R. PACKARD
WILLIAM H. CUNNINGHAM
BY Chapin & Neal
Attorneys

United States Patent Office 3,299,916
Patented Jan. 24, 1967

3,299,916
RADIAL ARM SAW ADJUSTMENT MEANS
Alfred R. Packard and William H. Cunningham, Springfield, Mass., assignors to Toolkraft Corporation, Springfield, Mass., a corporation of Massachusetts
Filed July 23, 1964, Ser. No. 384,755
4 Claims. (Cl. 143—6)

The present invention relates to improvements in motor driven tools of the radial arm type, particularly radial saws, and more specifically relates to improvements in the adjustment and clamping of elements thereof.

Machines of this type comprise a column, an arm extending radially thereof, a tool support pivotally mounted on the outer end of the radial arm and a work support beneath the radial arm. A motor driven saw is mounted on the tool support with the direction of cut relative to the work support being determined by the angular relation between the tool support and the radial arm. It has been an accepted practice to provide detent means to position the tool support in fixed angular positions relative to the radial arm in order to quickly index the saw to the most frequently used positions. Further, the pivotal mounting of the tool support enables the saw to be placed in intermediate positions so that an infinite range of angles may be obtained. Whether in a detent position or in an intermediate position, it is essential that the tool support be tightly clamped relative to the radial arm in order to obtain accurate cuts with the saw.

The object of the present invention is to facilitate angular adjustment of the tool support relative to the radial arm, in a quick and ready fashion allowing the tool support to be either set in a predetermined accurately adjusted position, or any desired position angularly displaced therefrom.

Radial arm tools of the type referred to comprise a screw thread clamp for firmly locking the tool support relative to the radial arm in a position determined by the detent means or in some intermediate position. In accordance with the invention, cam means are provided for automatically disengaging the detent means when it is desired to rotate the tool support to a new position. A single lever is operatively connected to the screw clamp and to the cam means. This single lever is movable in one direction to first loosen the screw clamp and then to cause the cam means to disengage the detent means to permit the tool support to be pivoted to a new angular position. Movement of this same lever in the opposite direction first displaces the cam means to permit yieldable engagement of the detent means and continued movement of the lever then tightens the screw clamp.

The above and other related objects and features of the invention will be apparent from the following description found in the accompanying drawings and the novelty thereof pointed out in the appended claims.

In the drawings:

FIG. 1 is a perspective view illustrating a radial arm saw in which the present invention is embodied;

FIG. 2 is a section on an enlarged scale taken on line II—II in FIG. 1;

Figure 3:
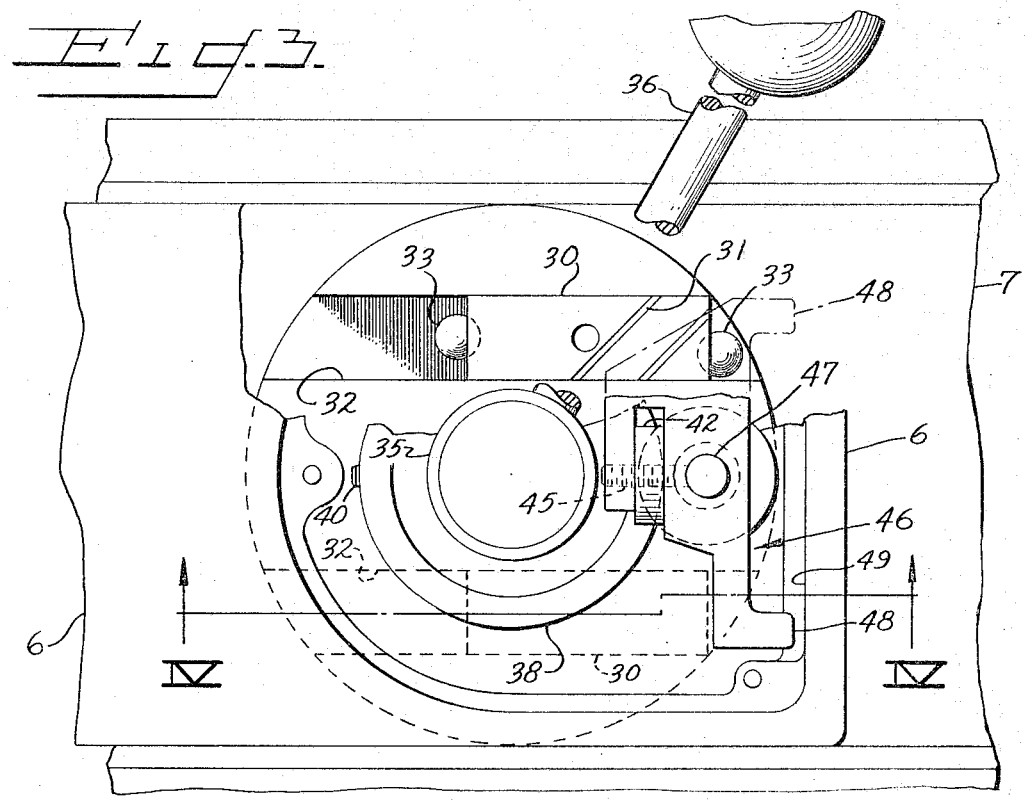
FIG. 3 is a plan view, with portions broken away, of the section seen in FIG. 2.

The environment of the present invention is best understood by reference to FIG. 1 which illustrates a radial arm saw of the type referred to. This saw comprises a post or column 5, having an arm 6, extending radially from the upper end thereof. A tool support in the form of a lower arm 7 is pivotally mounted on the undersurface of the outer end of the radial arm 6, and slidingly supports a carriage 8 for reciprocable movement along its length. A motorized circular saw unit 9 is mounted on the carriage 8 and arranged to be traversed relative to work pieces on a work support 10.

This type of tool is most frequently employed for relatively short cuts across the width of a workpiece, usually at a 90° angle, as in cutting workpieces to given length. It is also frequently employed to make angular cuts on the ends of a workpiece, particularly at 45° where mitered joints are required. The tool may also be used as a ripping saw by rotating the lower arm 7 to a position where it is disposed at right angles to the radial arm 6. For long pieces the carriage 8 would be locked relative to the guide 7 and the workpieces would be fed along the table 10 as lengthwise cuts are made. Other operations may be also performed with this type of tool using a circular saw blade or other type of cutting tool, all of which is familiar to those skilled in the art.

Next, having reference to the pivotal mounting of the lower arm 7 on the radial arm 6, a stud 16 (FIGS. 2 and 3) passes upwardly through an opening in the lower arm 7 with its head 18 underlying a thrust washer 20. Stud 16 passes through a bore in the radial arm 6 and has a nut 22 threaded thereon and compressing a disk spring washer 24 to hold a boss on the lower arm 7 firmly against a matching boss on the undersurface of the radial arm 6. The nut 22 is of the self-locking type so that once assembled, the spring washer 24 provides a fixed minimum bearing pressure between these bosses on the lower arm 7 and radial arm 6 at all times.

Figure 4:
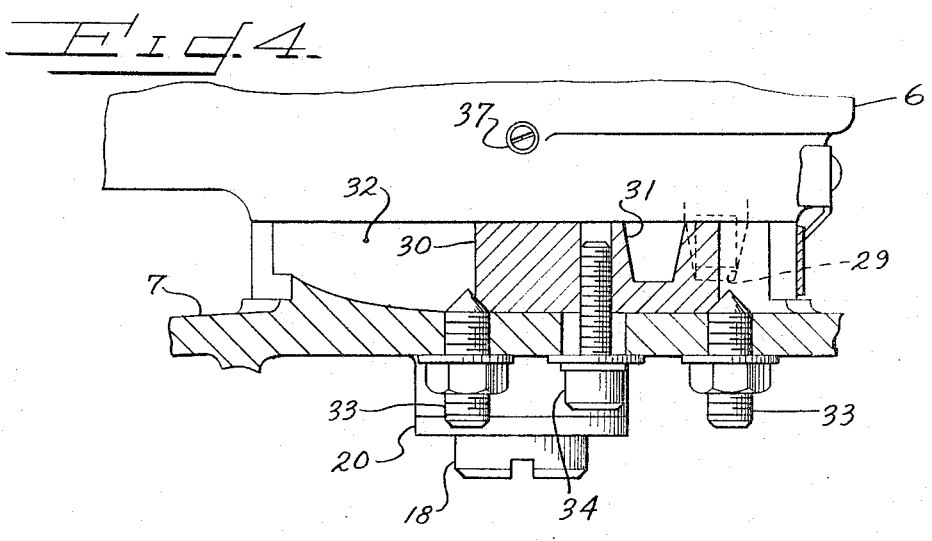
FIG. 4 is a section taken generally on line IV—IV in FIG. 3.

The lower arm 7 may be pivoted about the stud 16, as desired, to position the saw for cutting workpieces on the supporting table 10 at various angles therebeneath. As previously indicated, radial arm saws are most frequently employed in cross cutting, either at 90° or at 45°. To readily and accurately position the lower arm 7 in these positions, detent means are provided comprising a plunger 25 which is slidably mounted in appropriate insert 26 which is held in the radial arm 6 by a set screw 27. The plunger 25 is urged by a spring 28 into an opening 29 in the upper surface of the boss on the lower arm 7 for the 90° or straight cross cut position. The lower end of the plunger 25 and the opening 29 are of matching conical shape to facilitate entry of the plunger therein and accurate positioning of the lower arm 7. The detent means for the 45° positions comprise blocks 30 (FIGS. 3 and 4) having notches 31 for receiving the pin 25. Opposite sides of the lower end of the plunger 25 are slabbed on a taper corresponding to that of the notches 31, again for ease of entry and accurate positioning.

In order that the circular saw be accurately positioned for 90° cross cuts, the radial arm 6 is adjustable relative to the column 5 so that when the pin 25 is received by the opening 29, the lower arm 7 is precisely at right angles to work guides provided on the work support 10. In order that the 45° positions be accurately established, the blocks 30 are mounted in slots 32 formed in the boss on the lower arm 7. Cone pointed set screws 33 engage opposite ends of the blocks 30 to position them lengthwise of slots 32. Other screws 34 are provided to firmly seat the blocks 30 in the slots 31 and lock them in adjusted position.

A clamping nut 35 is threaded onto the upper end of the stud 16 and has a hand lever 36 projecting laterally from the upper end thereof. Rotation of the nut 35 through a relatively short angle is sufficient to effectively clamp the lower arm 7 securely relative to the radial arm 6. In this connection it will be noted that a set screw 37 is threaded through the radial arm 6 and engages the stud 16 to prevent rotation of the stud 6 relative to the radial arm 6. While there is some slight axial displacement of the stud 16 relative to the radial arm 6 when the nut 32 is rotated to clamp or lock the carriage guide, the use of a cone pointed set screw has been found effective to permit such axial movement while preventing rotation of the stud 16 relative to the radial arm 6. As an initial setup operation, the stud 16 is rotated so that lever 36 will be most conveniently disposed in tightening the nut 35 to lock the lower arm 7 in a given position. Set screw 37 then is tightened to lock the stud 16 in this position.

Reference is next made to a cam 38, which is secured to the clamping nut 35 by a set screw 40. The cam 38 underlies a roll 42 which is rotatably mounted on a pin 45 which also serves as a set screw to secure a collar 46 to the upwardly projecting stem 47 of detent plunger 25. Arms 48 are also formed on the collar 46 and are engageable with the inner surface 49 of the radial arm 6 to prevent any substantial rotation of the plunger 25 so that its tapered slabbed sides will be aligned with the notches 31 which have a corresponding taper.

Cam 38 is formed with its upper radial face as its working face engageable with the roll 42 and is arranged to free the detent pin 25 from the notches 31 or opening 29 when the lower arm 7 is to be pivoted to a new position relative to the radial arm 6. In the drawings the lower arm 7 is illustrated as being securely clamped or locked relative to the radial arm 6 as it would be when the saw was in use.

When it is desired to swing the lower arm 7 to a new angular position, the hand lever 36 is rotated for a short distance to loosen the nut 35 so that the lower arm 7 may be swung on the stud 16. After the nut 32 has been loosened, cam 38 engages the roll 42 automatically raising the detent plunger 25 to the phantom position, seen in FIG. 2, above the level of the opening 20. Preferably loosening of nut 32 and freeing of plunger 25 are accomplished with an angular swing of lever 36 through an angle of approximately 120°.

The lower arm 7 may now be swung to whatever new angle is desired as the hand lever 36 and nut 35 remain in an unclamped position with the detent pin 25 also held inoperative. When the new angular position of the lower arm 7 has been set, the hand lever 36 is moved in the opposite direction, first permitting the detent pin 25 to drop into one of the notches 31 while the lower arm is still free to be shifted so that the plunger is fully seated in one of the notches 31 or the opening 29. Upon continued movement of the lever 36 the nut 35 is further threaded onto the stud 16 an amount sufficient to securely lock or clamp the lower arm in its new position. If the lower arm is to be clamped in a position other than one established by the notches 31 or opening 29, the hand lever 36 may be swung the amount necessary to obtain a locking action from the clamping nut 35 as the cam 38 drops below the roll 42. Spring 28 permits the detent plunger 25 to remain in its raised phantom position out of engagement with any one of the notches 31.

It will be noted that cam 38 is preferably a separate element which is rotated relative to the nut 35 when the mechanism is initially assembled. This insures accurate positioning of the rise in the cam surface so that it will lift the detent plunger 25 after nut 35 has been slightly loosened.

As will be apparent, a roll type of follower need not necessarily be employed and other types of detent means would also be suitable. These and other modifications of the specific embodiment of the invention herein disclosed will occur to those skilled in the art and the scope of the present inventive teachings is to be derived solely from the appended claims.

Having thus described the invention, what is claimed as novel and desired to be secured by Letters Patent of the United States is:

1. In a tool of the type having a radial arm, a lower arm mounted therebeneath and at the outer end thereof to receive a saw carriage for reciprocable movement thereon, a stud projecting upwardly through said lower arm and received by a bore in said upper arm to provide a pivotal connection between said radial arm and said lower arm, a nut and spring washer assembly threaded onto said stud and holding the radial arm and lower arm in assembled relation, a set screw threaded through said radial arm and engaging said stud to prevent rotation relative to said radial arm, detent means for establishing predetermined angular positions to which said lower arm may be swung about said stud, said detent means comprising a plunger slidably mounted in said radially arm and notches formed in said lower arm and arranged to receive said plunger when the lower arm is in an angular position established thereby, spring means yieldingly urging said plunger towards said notches, a clamping nut threaded onto the upper end of said stud and engageable with said radial arm to draw said stud upwardly and firmly clamp or lock the lower arm relative to said radial arm, a cam member initially rotatable about the axis of said nut and secured thereto, said cam member having a cam surface on an upper face thereof disposed radially of said nut, a follower carried by said detent plunger and overlying said cam surface, means preventing substantial rotation of said plunger, a hand lever extending laterally of said clamping nut to provide means for the rotation thereof, said cam surface being so formed that said detent plunger is free to be seated in said detent notches when the clamping nut locks the lower arm relative to the radial arm and as the hand lever is first moved to loosen the clamping nut, said cam surface then being engageable with said follower to raise said plunger above the level of said detent notches upon further rotation of the hand lever through a total angular movement of approximately 120° whereby the lower arm may be freely swung to any desired angular position relative to the upper arm and further whereby upon reverse movement of hand lever the cam surface first lowers the detent plunger for yielding engagement with said notches and then locks the clamping nut upon continued movement of the hand lever.

2. In a tool of the type having a radial arm, a lower arm mounted therebeneath and at the outer end thereof to receive a saw carriage for reciprocable movement thereon, a stud projecting upwardly through said lower arm and received by a bore in said upper arm to provide a pivotal connection between said radial arm and said lower arm, a nut and spring washer assembly threaded onto said stud and holding said radial arm and lower arm in assembled relation, means preventing relative rotation between said stud and said radial arm, detent means for establishing predetermined angular positions to which said lower arm may be swung about said stud, said detent means comprising a plunger slidably mounted in said radial arm and notches formed in said lower arm and arranged to receive said plunger when the lower arm is in angular position established thereby, spring means yieldingly urging said plunger towards said notches, a clamping nut threaded onto the upper end of said stud and engageable with said radial arm to draw said stud upwardly and firmly clamp the lower arm relative to said radial arm, a cam member secured to said clamping nut and having a cam surface on an upper face thereof disposed radially of said nut, a follower carried by said detent plunger and overlying said cam surface, a hand lever extending laterally of said clamping nut to provide means for the rotation thereof, said cam surface being so formed that said detent plunger is free to be seated in said detent notches when the clamping nut locks the lower arm relative to the radial arm and as the hand lever is first moved to loosen the clamping nut, said cam surface then being engageable with said follower to raise said plunger above the level of said detent notches upon further rotation of the hand lever whereby the lower arm may be freely swung to any desired angular position relative to the upper arm and further whereby upon reverse movement of the hand lever the cam surface first lowers the detent plunger for yielding engagement with said notches and then locks the clamping nut upon continued movement of the hand lever.

3. In a tool of the type having a radial arm, a tool support mounted therebeneath and at the outer end thereof, a stud projecting through said tool support and said radial arm to provide a pivotal connection therebetween, means including a nut and spring washer assembly threaded onto said stud for holding said radial arm and tool support in assembled relation, means preventing rotation between said stud and said radial arm, detent means for establishing predetermined angular positions to which said tool support may be swung about said stud, said detent means comprising a plunger slidably mounted in said radial arm and notches formed in said tool support and arranged to receive said plunger when the tool support is in an angular position established thereby, spring means yieldingly urging said plunger towards said notches, a clamping nut threaded onto the upper end of said stud and engageable with said radial arm to draw said stud upwardly and firmly clamp the tool support relative to said radial arm, a cam member rotatable with said clamping nut and having a cam surface on the upper face thereof disposed radially of said nut, a follower carried by said detent plunger and overlying said cam surface, a hand lever extending laterally of said clamping nut to provide means for the rotation thereof, said cam surface being so formed that said detent plunger is free to be seated in said detent notches when the clamping nut locks the tool support relative to the radial arm and as the hand lever is first moved to loosen the clamping nut, said cam surface then being engageable with said follower to raise said plunger above the level of said detent notches upon further rotation of the hand lever whereby the tool support may be freely swung to any desired angular position relative to the radial arm and further whereby upon reverse rotation of the hand lever the cam surface first lowers the detent plunger for yielding engagement with said notches and then locks the clamping nut upon continued movement of the hand lever.

4. In a tool of the type having a radial arm, a tool support mounted therebeneath and at the outer end thereof, a stud projetcing through said tool support and said radial arm to provide a pivotal connection therebetween, a nut and spring washer assembly threaded onto said stud for holding said radial arm and tool support in assembled relation, yieldable detent means for selectively establishing predetermined angular positions to which the tool support may be swung on said pivotal connection, a clamping nut threaded on said stud for locking said tool support in a given angular position relative to said radial arm, a cam member rotatable with said clamping nut and having a cam surface thereon adapted to disengage said detent means upon rotation in one direction and to permit engagement thereof upon rotation in the opposite direction, a hand lever for rotating said clamping nut to loosen said tool support and permit its rotation relative to said radial arm, and means engaged thereafter by said cam surface for releasing said detent means upon continued movement of said hand lever after loosening of said clamping nut, whereby the tool support may be freely swung to any desired angular position, and further whereby upon reverse movement of the hand lever the cam means first permits engagement of the detent means and then the clamping nut is locked upon continued movement of the hand lever.

References Cited by the Examiner
UNITED STATES PATENTS

| | | | |
|---|---|---|---|
| 1,236,997 | 8/1917 | Tolles | 82—36.1 X |
| 2,722,952 | 11/1955 | Snyder | 143—6.1 |
| 2,942,632 | 6/1960 | Cassey | 143—6.1 |

DONALD R. SCHRAN, *Primary Examiner.*